Aug. 11, 1942.   E. T. FERNGREN   2,292,370
METHOD OF GATHERING MOLTEN GLASS
Filed April 29, 1938   6 Sheets-Sheet 1
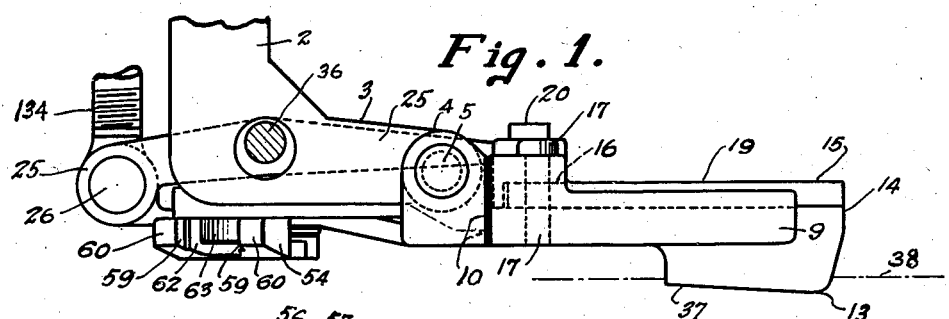
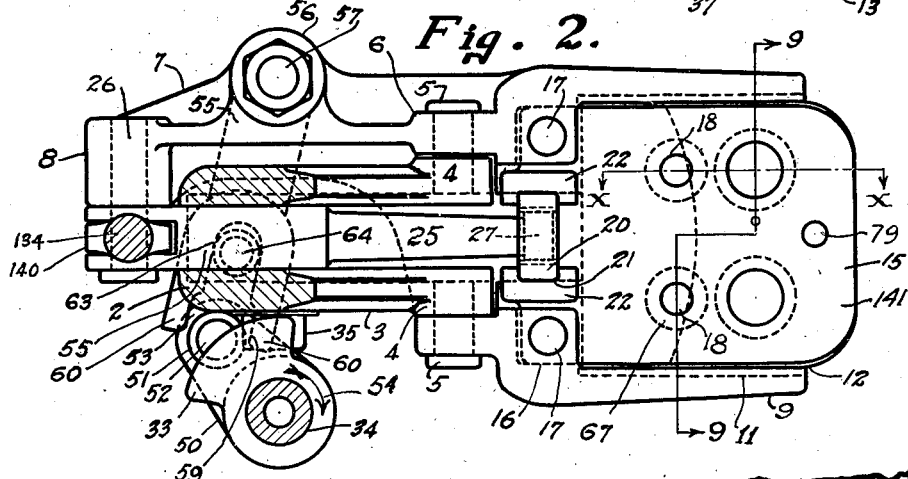
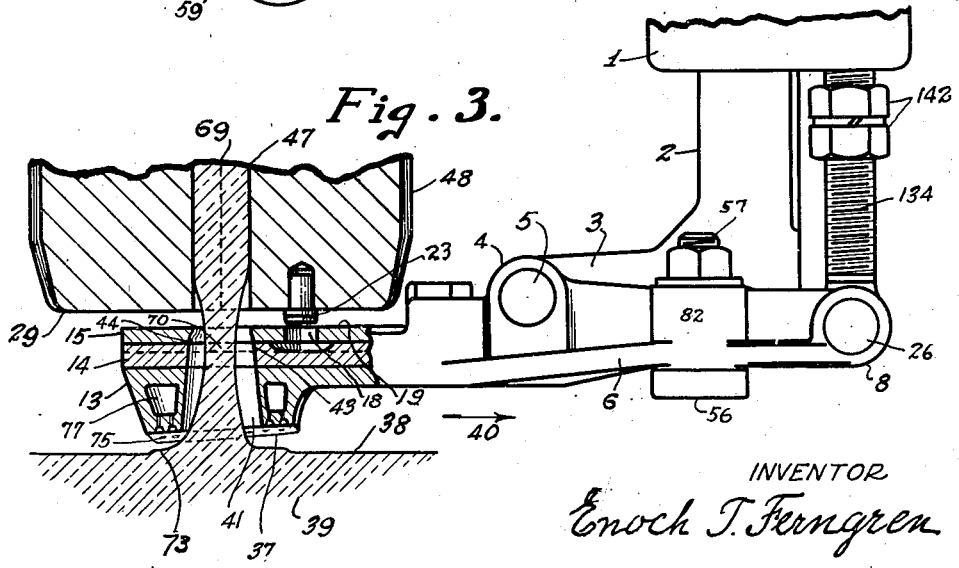
INVENTOR
Enoch T. Ferngren Aug. 11, 1942.  E. T. FERNGREN  2,292,370
METHOD OF GATHERING MOLTEN GLASS
Filed April 29, 1938  6 Sheets-Sheet 2
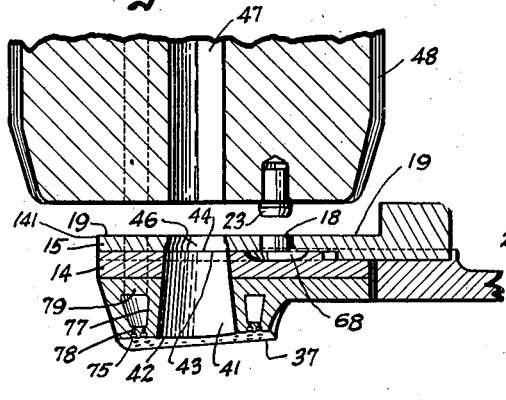
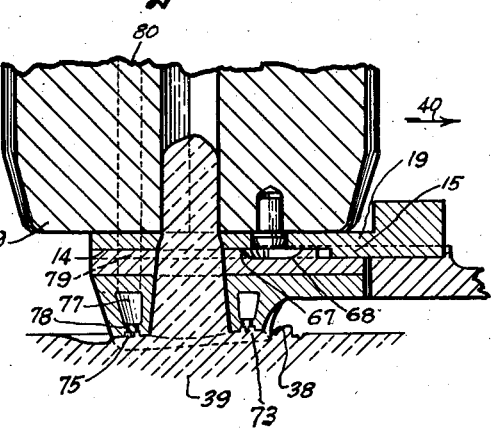
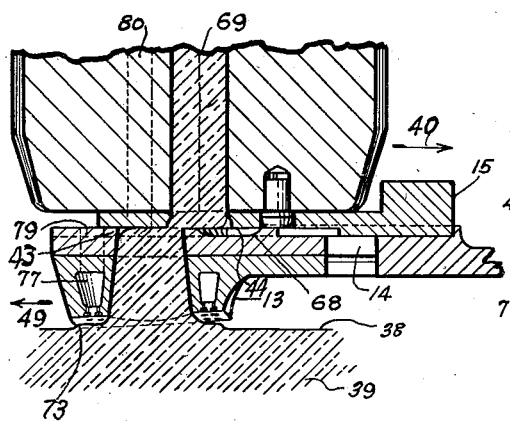
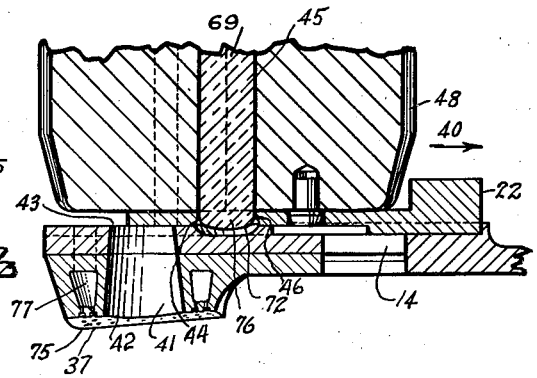
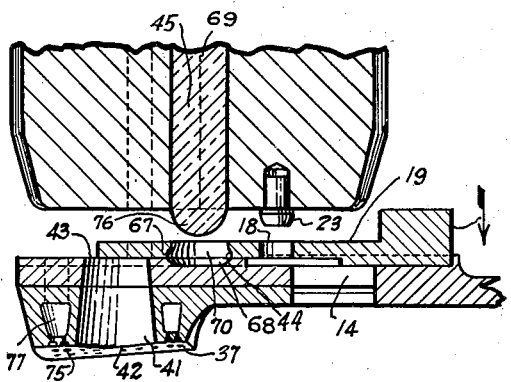
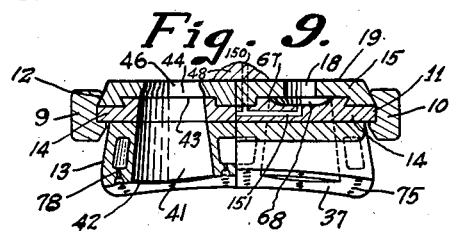
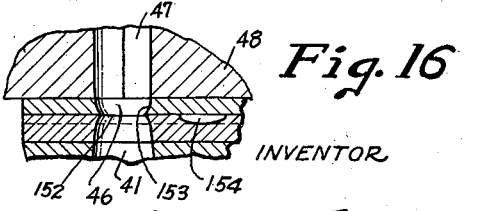
INVENTOR
Enoch T. Ferngren

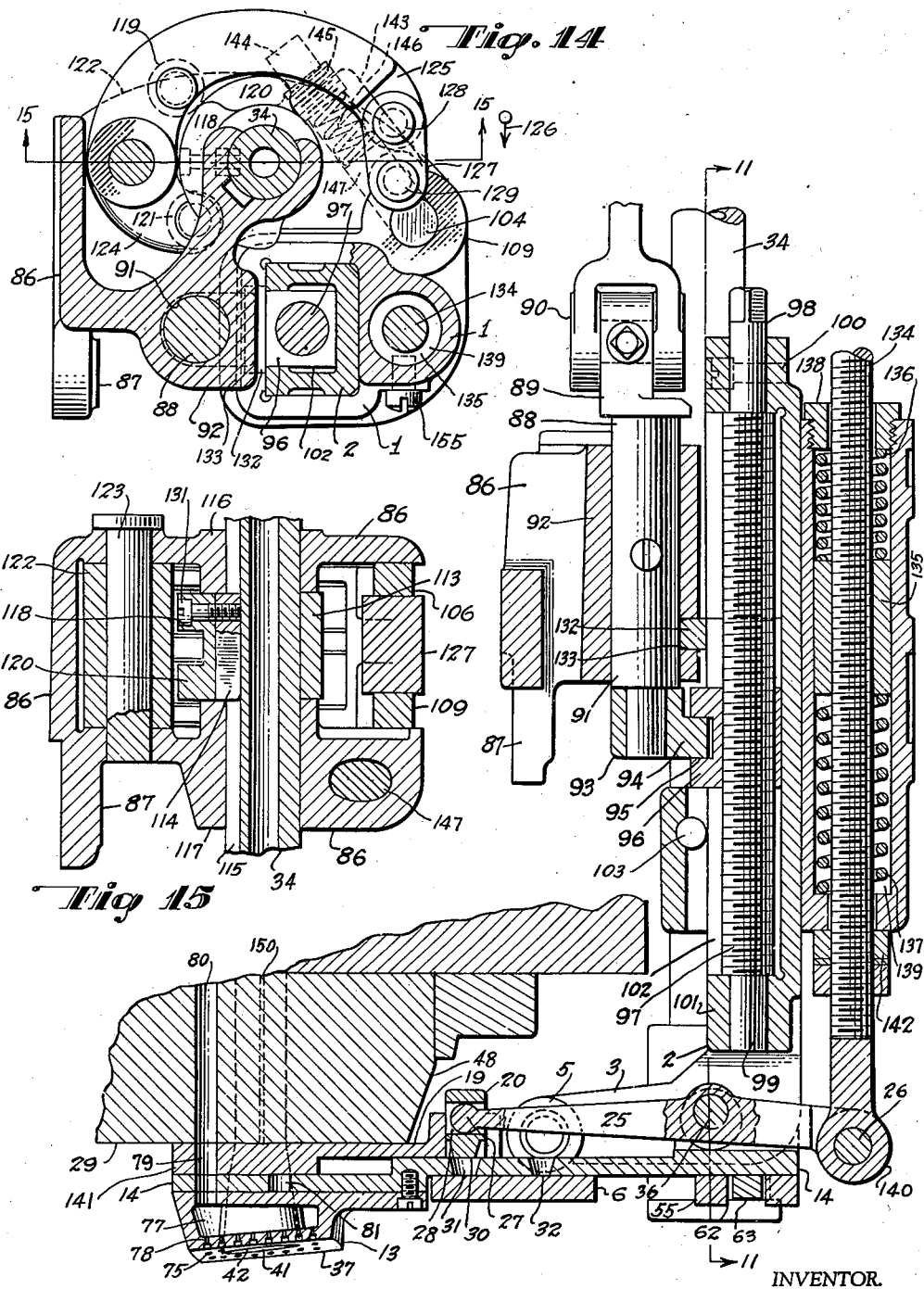

Aug. 11, 1942.  E. T. FERNGREN  2,292,370
METHOD OF GATHERING MOLTEN GLASS
Filed April 29, 1938  6 Sheets-Sheet 4

INVENTOR.
Enoch T. Ferngren

Aug. 11, 1942.  E. T. FERNGREN  2,292,370
METHOD OF GATHERING MOLTEN GLASS
Filed April 29, 1938  6 Sheets-Sheet 5
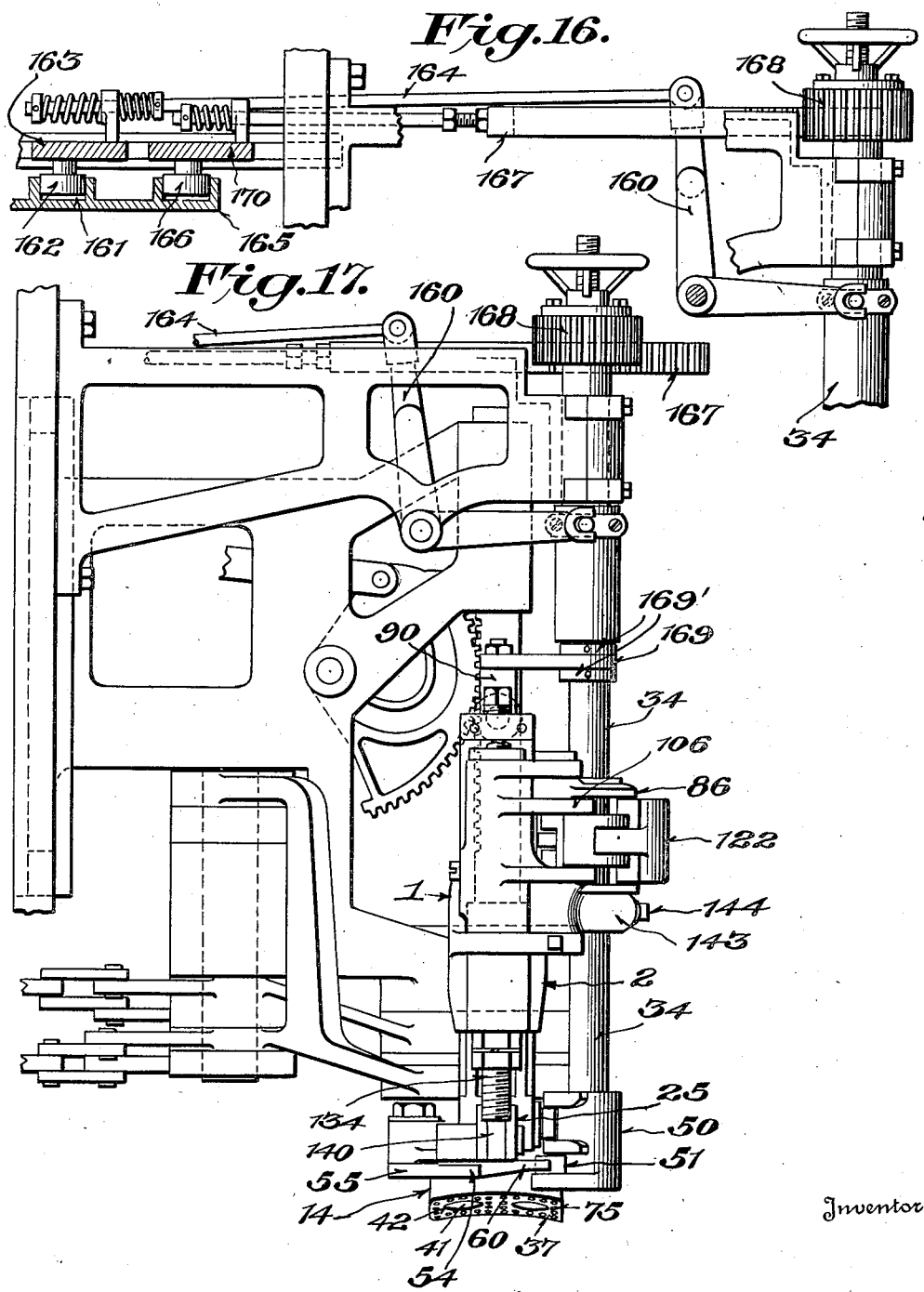
Inventor
Enoch T. Ferngren

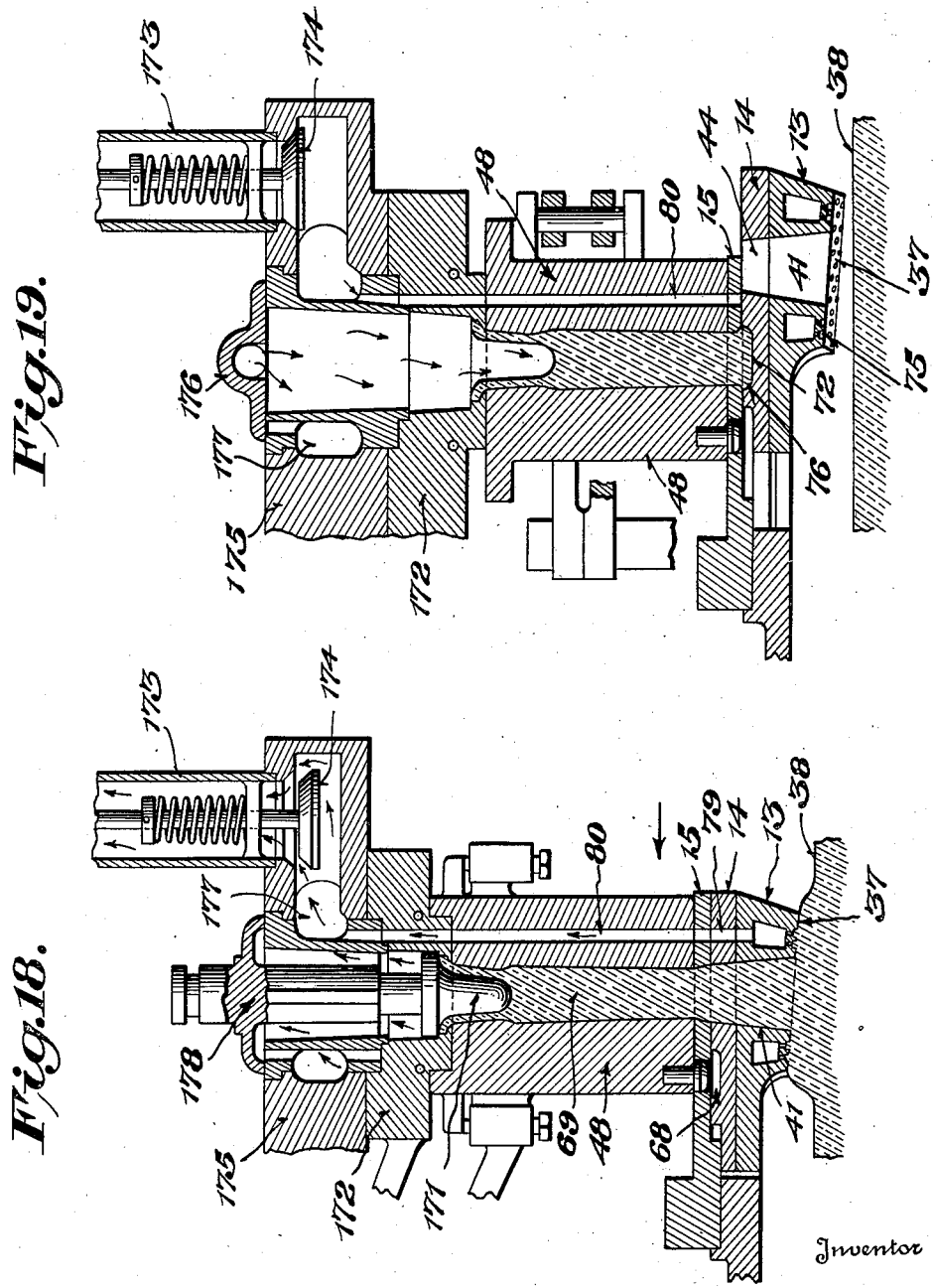

Patented Aug. 11, 1942

2,292,370

UNITED STATES PATENT OFFICE 2,292,370

METHOD OF GATHERING MOLTEN GLASS

Enoch T. Ferngren, Little Neck, Long Island, N. Y.

Application April 29, 1938, Serial No. 205,062

31 Claims. (Cl. 49—77)

This invention concerns improvements in connection with the gathering of molten glass into any kind of a forming mold but as herein shown the invention particularly relates to the gathering of molten glass into the cavity or bore of a blank mold by suction; or when molten glass is otherwise advanced into or caused to enter the receiving recess or bore of a shaping mold by the action of a vacuum in the mold, or by a force applied and acting on and through the glass outside of the bore of the blank mold; or when charging any glass forming mold by combination of forces capable of causing molten glass to flow upward, well-up, flow or extrude in a given direction to deliver a quantity of itself to a mold and to accomplish all such glass delivery to molds with greater speed of charging the molds with the result of greater perfection in as well as greater production of finished glassware.

The invention further relates to improvements in separating the glass which has been received into the bore of the blank mold from its parent body, such separation normally to occur at the instant that the blank or primary mold has been charged with the required quantity of molten glass. The main object of the improvement being to cut the glass from its source with less injury to the glass at point of severence so as to avoid shear marks and to carry the elimination of shear-marks to a point of certainty by covering over the severed lower end of the glass blank with hot fluent glass which will have had no prior chilling contact with any glass cutting or molding element and to then shape the lower end of the blank into a rounded, downwardly tapering body which will receive a uniform skin-congealing all around and thus form a bottom end-wall of uniform thickness in the article which is blown from the blank.

The invention also relates to improvements in handling the top stream or upper surface level of a supply of molten glass in the gathering end of glass furnace, or of any gathering pool or body of glass directly at the point of presentation of the glass to suction molds, to the end that the supplying molten glass may always be not only of a serviceable consistency, but that it will be of a uniform molten consistency at all points through its surface and body and of uniform characteristics with regards to its viscosity and tenacity at all similar temperatures, and be possessed of a uniform extensibility as well as like susceptibility with regards to setting and hardening, all of which factors and properties, with exception of shear marks and the like, are determined principally by the treatment and handling of the glass prior to its delivery to a blank mold.

The invention furthermore is concerned with such innovations in the technique and practices in glass manufacturing as are exemplified by obtaining charges of molten glass without the assistance of the usual revolving tank. The gathering of the charges to be performed with less of chilling of the exposed surface of the mold supplying parent body of the molten glass at the zone of suctional gathering of the glass into molds, than has heretofore been the case. The lesser chilling resulting from the new arrangement of not dipping the lower end of the glass gathering mold bodily into the body of molten glass and by reducing the area of glass surface contact at the time of gathering, and by removing all of the contacted glass supply at which the next mold charge is to be taken or from the zone where each of a series of successive molds are moving to obtain their charges.

In connection with the foregoing several novel matters, there are other useful methods and features incidental to this invention, which will be hereinafter pointed out and claimed.

One of the common defects, in connection with obtaining so-called blanks of molten glass by suction, results from the use of the customary combination of a cut-off knife with the lower edge of the mold-bore when severing the mold charge from its source. The ordinary cut-off knife as it is used along the bottom of the suction-mold is so related to the bottom of the mold-bore when severing the mold charge from its connection with the supplying glass, that it is partly causitive of forming the unsightly shear-mark at the bottom end of the blank, or rather the finished bottle or article made from a blank obtained in such fashion.

While shear-marks are more or less associated with all of the mold-charging methods now in use and the various schemes for cutting off streams, gobs, or other forms of glass charges, such marks are more noticeable in the bottom section of blown articles formed out of glass blanks which have been gathered by suction.

It is one of the purposes of this invention to provide various means for manipulation and function in connection with molten glass by which many different processes, may be practiced, so that this shear-mark defect may be avoided or eliminated when separating a suction gathered mold-charge from its supplying body. In this respect the invention may also be adopted for many other methods of obtaining glass mold-charges.

The main reason for the more noticeable shear-mark on the bottom of a glass article made from a suction gathered blank is this, that the bottom of each mold is normally caused to be in direct contact with the surface of the body of molten glass from which the glass-blank is gathered, with the result that this surface glass is chilled and reduced in its fluency adjacent to, or circumferentially around the edge of the opening to the mold-bore. Then, the glass of the supply which wells upward into the bore of the blank-mold in response to the vacuum condition therein, is practically only doing so in its central portion centrally of the bore of the mold-cavity, for the reason, that the glass which progressively contacts with the walls of the mold-bore is immediately chilled and arrested at its point of contact and thus stopped in its upward movement.

The result of this is that the glass which stopped in the vicinity of the edge or opening of the mold-bore will be exposed to a longer period of chilling contact with the side walls of the mold-bore while the glass last to contact with said mold-bore will lose considerably less of its surface heat and fluency. Therefore, at the opening to the mold-bore there are now two surfaces of chilled glass which are set at right-angles to one another, that is, the horizontal surface where the bottom of the mold contacts with the glass supply and the vertical surface inside of the mold-bore, which in the nature of things, are joined at the bottom edge of the mold-bore and it is this edge which has been subjected to the greatest amount of chilling.

Following the complete charging of the blank-mold by suction it has been a customary and necessary practice to slightly elevate the mold from contact with the chilled surface glass of the supplying body, or pool, of molten glass and to then cause the edge and blade of the cutting-knife to sweep across this already quite chilled corner edge of the glass at the bottom of the mold-bore, and as the cutting-knife cuts through the connecting glass of the supply which hangs below the bottom of the mold and severs said glass at the opening of the mold-bore, the previously chilled exterior surface edge portion at the lower end of the glass blank is now further chilled into rigidity.

Further, the customary practice of keeping the upper flat surface of the cut-off knife directly under the lower cut end of the glass blank in the bore of the mold so that the knife blade is held at right-angle to the side wall of the glass in the opening of the blank mold, naturally further reduces the heat retained at the lowermost edge of the blank, and as a result the glass surface, or the exterior skin portion thereof, at the lower end and edge of the glass blank becomes practically solidified, resulting in the shear-mark so noticeable in the bottom of a blown article.

While the elimination of the shear-mark is one of the objects of this invention and a result of the arrangements hereinafter to be shown and described, it is also the purpose of this invention to provide a new method of severing or of separating a mold-change of molten glass from its source, more by inducing a condition of cleavage than by penetration of sharp cutting-edges.

With regard to those objects of the invention which relate to the eliminate of the revolving tank, it may be noted that the employment of a rotary gathering tank is quite a large item of expense. Also, the glass itself will now be entirely uniform in temperature, consistency and fluency, as each mold-charge obtained according to this invention will be obtained from virgin previously untouched source of supplying glass, thereby assuring a smoother schedule of production and an ultimate result of perfect glassware.

The mechanisms of the present invention that make it possible to gather charges of molten glass directly from the glass in the refining tank at some point of said tank where it can be conveniently exposed to the action of suction mold are normally adapted to operate when the glass of the furnace is extended at normal tank level into a furnace extension or bay over which the suction molds would normally dip and operate, however, in this case the molds themselves do not touch the glass. The mechanism consists of a glass gathering cutting and working device, through which the glass of the supply is gathered into the suction mold and in which device the glass is severed and the lower end of the glass blank is re-shaped.

This device, as illustrated, may be connected to and operated from the dipping-head which carries the suction mold in the ordinary rotary machines of this kind, see the patents to Owens 765,768, Bock 870,664 and 852,097, La France 1,185,687, Owens 1,547,439, La France 1,641,497 and 1,702,262, or else the device may be independently supported and operated so as to be connected to the bottom of the dipping mold. The device forms an orifical portion through which the glass which is to form the mold-charge is caused to advance from the glass supply in the furnace into the bore of the mold.

To make such glass delivery practically possible the glass gathering mechanism is organized to form a downwardly projecting extension of the blank-mold, but the device is also detachable from the bottom of the mold for purposes as will be hereinafter explained. Devices of the kind herein shown may also be arranged to function not only with one mold but with several molds of a series of molds, for instance, three gathering devices may be used to operate in succession with a series of twelve molds, and the number of molds may be increased.

According to the mechanical arrangement herein shown the device is arranged to be connected and operate with one mold, as for instance, in connection with the dipping-head such as the well-known Owens automatic suction and glass-blowing machine, but as previously stated this supplemental or auxiliary glass gathering mechanism may be connected to and operated from any type of dipping-head or may be operated from any suitable mounting adjacent to the zone of operation of a series of suction molds in which case one or several gathering mechanisms may be employed.

The first requirement in operating the mechanism herein shown, in connection with the bottom of a blank-mold, is to secure a good practically air-tight seal with a bottom surface of the mold and also with the upper surface of the glass-body from which the mold-charge is to be removed, so that the said charge may be obtained in a fraction of the time now consumed for the entire mold-charging operation, that is, a suction mold equipped with this supplemental mechanism need not be stopped in order to take on a charge of glass but preferably should be continuously moved at a rapid pace into and out of mold charging location. One outstanding advantage of the use of the mechanism being this, that the mold can be moved along its path of mold-charging at a much greater average speed than heretofore, when taking its charge of molten glass from the supplying body.

This higher speed of operation increases the production of glassware which, in turn, reduces the overhead cost of production and that is an object as well as an accomplishment of this invention when practiced according to any of the methods herein suggested or any of the forms herein disclosed.

An important object of the gathering mechanism is to move that portion of the surface glass of the supply with which sealing contact is had in the direction of the movement of the suction mold, so as to insure that this contact-chilled glass will be moved away from that portion of the glass body surface where each succeeding contact by succeeding molds is to be made, thereby providing a strictly virgin glass for each successive mold. By virgin glass it should be understood a previously untouched glass of uniform consistent fluidity.

Another purpose of the gathering mechanism is to dispose of this contacted glass portion of the surface glass, either in a compartment to one side of the gathering pool proper and separate from any direct connection with the main supplying glass-body; or to move such contacted glass outside of such body and deposit it within a channel communicating with a melting end of the tank. Another expedient may be adopted by which this contacted glass may be transported to that part of the melting tank where the batch of glass making material is introduced. When so handled the contacted glass portion may be introduced while in a partly fluent state or it may be chilled and introduced as a cullet, in which last form this glass may be discharged from the gathering mechanism at any suitable point inside or outside of the glass furnace before being used. In case of a very large gathering-bay when the contacted glass has been moved by the gathering mechanism to a point to one side of said bay entirely out of the actual zone of contact by the gathering mechanism or any succeeding gathering mechanism with the supplying body of glass, the contacted portion of the surface glass may be thrust down by the gathering mechanism before it releases the contacted glass so that the contacted portion will be covered over by the more fluent glass of the supply body, or else this contacted portion may be lifted into a channel next adjacent to the supplying body of glass and deposited by the gathering mechanism at a slightly higher level in said channel, so that this contacted glass will flow by gravity from its deposit into such locality of the furnace as may be convenient for restoring it into a like consistent fluidity with the glass normally produced in said furnace. All of these suggested procedures may be considered as a part of this invention and within the scope thereof.

A further object of the gathering mechanism is to have its lower glass contacting face so placed and shaped with relation to the surface of the glass body from which the mold-charge is to be removed that the forward speed of transit of the mold through the glass-gathering zone will be an aid in speedily charging the mold with the required quantity of glass. That is, the lower face of the glass-gathering mechanism should be arranged at such an angle relative the surface of the glass that a displacing and scooping action will be had on the glass body.

Further objects connected with the use of the mechanism is to produce a cleavage cut-off of that portion of the contacted glass which must be severed from the mold-charge and simultaneously therewith produce a displacement of this glass away from the mold-charge proper; and to enable a number of manipulative steps in connection with such or other forms of severance of the mold-charge from the supplying body of the glass, for the purpose of securing in the lower end of the glass-blank which is to be blown or pressed into an article, not only freedom from premature chilling and shear-mark but also to impart such conditions of fluidity coupled with a uniform heat reduction in the surface of the glass or such even uniform skin-congealing as will produce an evenly expandable bottom end on the glass blank resulting in a final glass wall of uniform thickness and internal tension in the blown or pressed article, thereby causing increased strength and durability in the bottom portion of a bottle or the like, so as to reduce the percentage of faulty glassware.

In connection with using a revolving tank during suctional gathering, it should be noted that when such tank is used, it has been customary to leave each contact-chilled portion of the glass within the environ of the tank as such portion is cut away from the glass which entered the blank-mold.

This partly chilled glass left in the rotary tank is supposed to be restored to proper fluency before it is again brought into any mold supplying relation by the rotation of the tank. This restoration, it is claimed, is partly caused by the freshly molten glass which is constantly poured from the glass furnace into the revolving tank to cover over and fuse with each portion of the cut-off glass which by this expediency and also by local heating is expected to be restored to its original fluency.

While this is the theory and partly accomplished with certain kinds of glass compositions, it is not always true and in most cases the glass-body in the revolving tank will be composed of a molten glass which while it may have the same temperature will not have the same fluency at that temperature because the prior chilling has to some degree changed the nature of the glass, so that even when re-heated there is a condition that the mold-charges taken by the successive molds will have been supplied or composed of a glass of different viscosity resulting in that a glass-blank when blown into a bottle will expand disuniformly which shows itself as a wall of variegated or different thickness or so-called wavy structure in the finished bottle or article.

It is this serious shortcoming which is corrected by the use of the glass-gathering mechanism and also the tendency of over-heating the lower end of the blank-molds as is the case when such molds are used as glass raking implements in some types of suction gathering which is practiced when the revolving tank is dispensed with and the molds themselves are used to remove chilled glass away from the path of succeeding molds.

The supplemental glass-gathering mechanism herein shown, as heretofore mentioned, is arranged to be carried by the dipping head structure which supports the blank-mold but the gathering mechanism is not a part of the mold except as to a small fraction thereof, but is rather one of a series of independently moveable and mechanically organized and operative members each of which are to be interposed between the surface of the glass supply and the bottom of the blank-mold of each series of molds.

While my interposed gathering member acts as a moveable discharger spout for an horizontally disposed glass-body at times of supplying the mold, it also acts as a mechanical aid in the charging of glass into the molds, as a glass skimming implement and adjustable cut-off and further as a shaping medium and fixture of surface temperature for the lower end of the glass-blank.

In this connection I wish again to point out that my interposed supplemental device may be operated fully as well from a point adjacent to the furnace structure in the vicinity of the dipping base thereof; in other words, the supplemental or gathering mechanism or element can be supported and operated so it can perform all of its functions from points entirely independent of the mold or its support and so utilizing this mechanism or arranging it would involve only ordinary mechanical skill so it can be moved in the path of the mold in the same way as herein shown.

In the drawings:

Figure 1 is a side elevation of the lower end of the supplemental gathering-mechanism of Fig. 2;

Fig. 2 is a top plan view of the mechanism partly in section;

Figure 13:
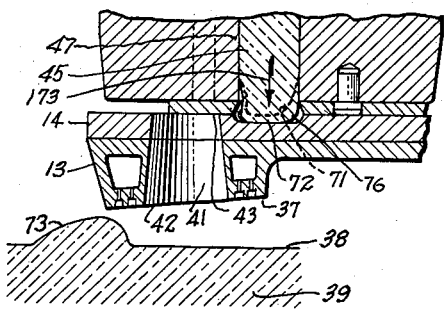
Figure 12:
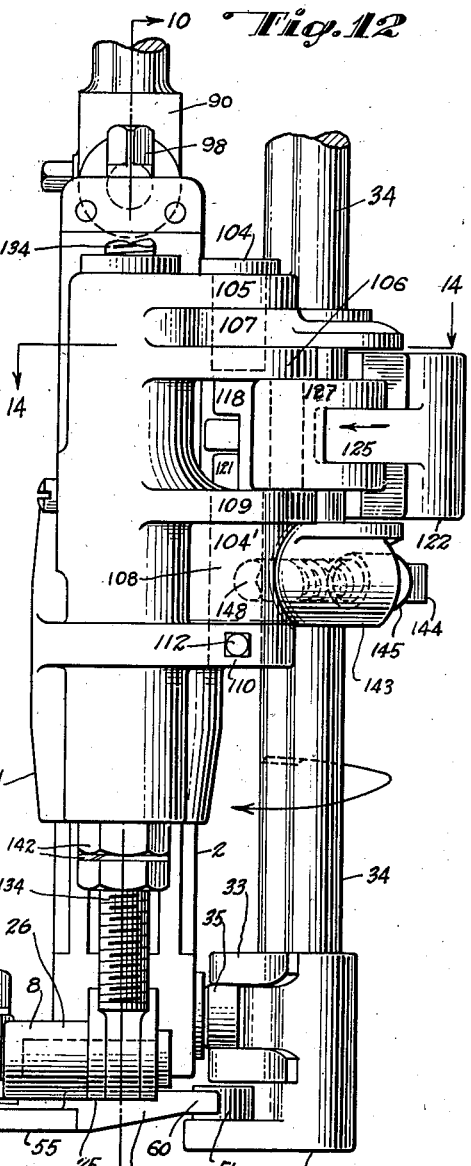
Figure 11:
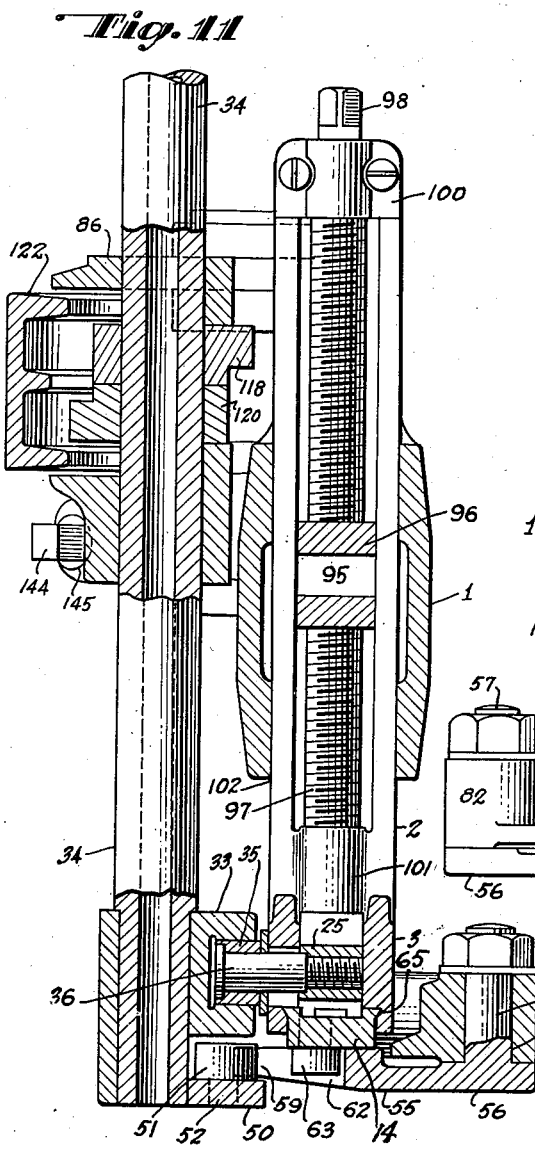

Fig. 3 is a side elevation and partial as viewed from the opposite side of Fig. 1. In this figure the mechanism is shown in operative relation to the supplying glass-body and to the blank-mold. This figure illustrates a modification of process and a step thereof prior to the severance of the mold-charge and the subsequent shaping of the lower end of the glass-blank;

Fig. 4 is a fragmentary vertical section showing the blank-mold and the gathering mechanism in relative position when going into operation to take a charge of the molten glass;

Fig. 5 is a similar section showing the blank-mold and the supplemental mechanism when in operation taking a charge of molten glass;

Fig. 6 is a similar section showing the relation of the lower portion of the mechanism to its upper portion when severing the supplying glass from the glass charge in the mold;

Fig. 7 is a similar section showing the relationship between the blank-mold and the mechanism after the disposal of the contacted and the cut-off portion of the supplying glass during an instant of the shaping procedure at the lower end of the glass-blank;

Fig. 8 is a similar section illustrating the relationship of the parts, after the lower end of the glass-blank has been tapered;

Fig. 9 is a sectional view taken on line 9—9 of Fig. 2 showing the construction of the mold connecting and glass operative portions of the mechanism;

Fig. 10 is a vertical section in elevation taken centrally along line 10—10 of Fig. 12 showing especially the inner construction of supporting and actuating parts;

Fig. 11 is a part elevation and vertical section taken on line 11—11 of Fig. 10 showing some of the actuating parts of the mechanism;

Fig. 12 is a rear end elevational view of the control and activating parts including some of the supporting structure;

Fig. 13 is a fragmentary section illustrating the procedure of eliminating shear-marks and forming a rounded end at the lower point of the glass-blank body;

Fig. 14 is a cross section taken horizontally on line 14—14 of Fig. 12;

Fig. 15 is a fragmentary vertical section taken on line 15—15 of Fig. 14;

Fig. 16 is a fragmentary side view in partial section of the known Owens machine;

Fig. 17 is a similar view to Fig. 12 with the lower parts more in detail showing the gathering mechanism;

Fig. 18 is a fragmentary vertical section showing the raising of the molten glass by suction; and Fig. 19 is a similar view showing the compressing of the blank in the blank mold by means of compressed air.

The invention herein disclosed is mainly concerned with a new method of operation on molten glass when taking mold-charges by suction. Some of the means and mechanisms necessary in handling this new process have inventive merits in relation to the task performed and in new and useful results obtained.

The mechanisms shown in Figs. 1 to 3, 9, 10, 11 and 12 and other figures are illustrative only of one type of many like devices which may be constructed along similar lines and be suitable to carry on the processes herein disclosed and any variations thereof. As such, the mechanisms are thought to be necessary for obtaining the best results when charging blank-molds by suction or when taking charges of molten glass into molds from any supplying body of the glass where somewhat of a similar relationship exists or is caused to be.

The parts of the supplemental gathering mechanism herein disclosed and described will be concerned largely with such parts thereof as are closely or mainly related to the carrying out of the invention, omitting the primary or activating mechanisms which are available in the dipping head structure of the ordinary suction and blowing machine.

The housing 1, (see Figs. 1, 2, 3, 10, 11 and 12) is attached to a bracket housing 86 of the supporting structure of a blank-mold dipping head, such for instance as is available in the Owens bottle blowing machine where molten glass mold-charges are taken by suction. The housing 1 gives support to a vertically adjustable and periodically both vertically and horizontally movable supporting housing member 2, which is shaped at its lower end into a divided horizontal foot-extension 3. The foot-extension 3 is divided or formed into the outer hub-parts 4 in which is mounted a fork supporting member 6 on the stub shafts 5. The member 6 has a rear extension 7 having a hub 8 and a U shaped front structure comprising the forked arms 9 which are provided with the grooves or slots 11 along their inner faces 12 for slideably supporting the heel portion 13. This heel portion 13 is attached at the outer edge of a slide 14 and gives support to the superimposed plate 15, which is that portion of the mechanism that is brought into close contact with the bottom 20 of the blank-mold 48, at the time of charging the bore 47 of the same with the molten glass 39 by vacuumal activity in the mold-bore and its connections.

The plate 15 in reality is a part extension to the bottom of the mold 48 in the manner of its function with relation to the molten glass.

The contact plate 15 is also attachable to the supporting member 6 at the horizontally slotted points 16 by means of the bolts 17 and the plate may be readily detached from the assembly by the removal of the said bolts. The fork arms 9 which hold the plate 15, are kept in rigid horizontal position by the points 10 of the foot extension 3.

The alignment plug 20 is mounted for vertical reciprocation in the vertical grooves 21 of the guide posts 22 which posts are integral parts of the plate 15 (see Figs. 2 and 10). The plug 20 is raised and lowered by the lever arm 25, the rear end of which is journaled on the pin 26 which is supported by the hub 8. The rounded front end 27 of the said lever arm engages the recess 28 within the plug 20 so that when the lever arm 25 is activated the plug 20 and the lowered tapered end of the said plug will be elevated out of its associated recesses 31 or 32 in the slide 14 (see Fig. 10). The lever arm is activated by a cam 33 mounted on the vertical shaft 34. This shaft is suitably turned by an activating mechanism (not shown) to cause the cam 33 to alternately swing or rotate in opposite directions and when the cam is thus operated the roller 35 on the outer end of the stub shaft 36 is engaged by the cam (as shown in Figs. 2, 11 and 12), to lift the arm 25 and the alignment plug 20.

The stub shaft 36 is a part of and projects outward from one side of the lever arm 25, (as shown in Fig. 11) at the point thereon only one-third of its distance in length away from the fulcrum point of the lever at pin 26, (see Fig. 1), and it follows that the forward end 27 of the lever which is confined in the recess 28 will move twice as far upwardly or downwardly as that point on the lever 25 which is raised or lowered by the cam 33.

The shaft 34, around the vertical axis of which the cam 33 is turned, is the same shaft which is used for similar actuation of the cut-off knife in the Owens machine.

It will be understood that normally the lower end 30 of the plug 20 is seated either in the recess 31 or in the recess 32 and that the plug is lifted out of these recesses by the action of the cam 33 only when the slide 14 is to be moved forward or rearward for the alignment of the different orificial portions in the heel 13 and the slide 14 preceding and following the glass-cutting operation, or the operation of charging the mold. In this connection it should be noted that the slide 14 is that member of the mechanism to which the dipping heel 13 is secured, as shown in the several figures.

This heel 13 has a functional use when in contact with the glass body 39 and when it is moving therethrough in the direction indicated by the arrow 40, Fig. 3. This function is of a glass displacing nature and somewhat of a combination of an impeller and a scoop in its mechanical action on the molten glass, which due to the angle of contact and the speed at which the apertured face 37 of the heel is moved, increases the contact pressure of the heel on the surface of the glass-body during the gathering period, this speed in this instance is the speed at which the mold 48 is moved over the glass-body.

This action of the lower surface 37 of the heel 13 on the surface 38 and its adjacent sub-stratum on the body of molten glass is of a glass gathering nature and will force the glass to move upward into the two adjacently located upward outwardly tapering bores, passages or conduits 41.

This action is as if a portion of the surface glass 38 was being collected by displacement or scooping and thus forced to advance upward through the openings 42 of the conduits 41 in the heel 13, into the clearance spaces provided by these two conduits; this kind of a force movement of the glass being accelerated by a vacuum action in the mold-bore 47 thereby speeding the charging of the mold-bore 47 with the required quantity of molten glass.

It is important that the upper edge 43 at the upper end of each conduit 41 be in precise alignment with the lower edge 44 of the bores 46 in the contact plate 15, so as to form a continuous smooth wall surface of passage through which the glass can advance into the mold-bores 47 of the blank-mold 48 and to insure this unbroken or smooth wall surface the alignment plug 20 is used to positively lock the conduits 41 and 46 in exact orificial alignment so that all edge portions of these parts will be in concentric alignment with one another when the mold cavities 47 are charged with the molten glass. The object being to impart the first contact chilling to a continuous smooth surface of the molten glass without any angular offset along such surface at any point or at the point of severance of the mold-charge.

The upper face 19 of the plate 15 has contact with the lower surface 29 of the blank-mold 48 and the two bores 46 through the plate 15 are held in alignment with the mold bores 47 by means of the recess 18 in the plate 15 and the alignment-buttons 23 which projects a short distance below the bottom-face 29 of the mold and enters into the recess 18 when the glass gathering mechanism is raised or elevated to go into contact with the lower surface of the mold. The alignment being the same for plural or single molds.

As shown in Fig. 10 the tapered portion 30 of the alignment plug 20 has been raised out of the recess 31 by the action of the cam 33 which action occurs before the slide 14 is to be caused to advance in the direction of the arrow 49 by the action of the crank arm 50 and its roller 51 which, as shown, are actuated by the shaft 34, for reference see Figures 2, 10, 11 and 12.

As shown, the pin 52 is secured to the outer end of the crank arm 50 and the roller 51 is rotatable around this pin. The crank arm 50 is normally turned in the direction of the arrow 54, by the movement of the shaft 34, when the parts are located as shown in Figure 2, during which movement the roller 51 enters the gap 53 at the outer end of the forked or slotted portions 60 of the member 55. The opposite end 56 of this member has a vertical stub-shaft 57 which is integral therewith and which shaft is journaled for turning movement in the vertical bore 58 of the hub 82. (See Figures 2 and 11.)

As the roller 51 advances into the gap 53 of the slotted end 60 of the member 55, the roller contacts with the inner face 59 of the slotted end, thereby moving this end partly in the plane of the movement of the crank arm 50 and incidentally causing the stub-shaft 57 of the slotted member 55 to turn in the bore 58 until the roller 51 of the crank arm 50 moves out of the gap 53, due to the differences in the direction of the rotational movement. (See Figure 2.)

During this movement of the slotted member 55, the inner and more narrow slotted portion 62 thereof which engages the roller 63, rotatable and mounted on the pin 64 of the slide 14, will advance the slide along its horizontal guide grooves 65 which are dovetailed-cut in the foot members 3 (see Figure 11) and after such movement the alignment section 30 of the plug 20 is caused to enter the recess 32 of the slide member 14, to again lock the slide, but this time this procedure is for the purpose of accurately registering the circular edge 67 of the spherical cavity 68, which are formed in the slide 14, with the lower edge 44 of the bore 46 in the plate 15 (see Figure 8).

This second alignment is important in order to avoid shear-marks or other grooved markings when shaping the lower end of the glass blank, hence the necessity for this second locking action by the plug 20 and lever arm 25, which is caused to occur when the cam 33 in the course of its rotation towards the right as indicated on Figure 2 depresses or releases the roller 35 of the lever arm 25; and this resetting of the plug part 30 in the recess 32 happens when the roller 51 has completed its actuation of the member 55 at which instant the slide 14 will have reached its most forward position after the severance of the column of glass, or the cutting of the supplying glass, at the orificial edge 44 of the plate 15.

Several kinds of glass severing action can be practised within the gathering mechanism, depending on its relationship to the supplying glass, or to the column of glass, which is to be severed and to other conditions associated with such action.

For instance, as shown in Figure 3, the glass column has been attenuated at points below the bottom of the blank-mold directly after the bore 47 of said mold has been fully charged. This attenuation of the supplying glass is caused either by giving an upward movement to the mold so it will travel away from the glass gathering mechanism and the plate 15 thereof, or by giving a downward movement away from the mold bottom 29 to the assembled parts of the glass, gathering mechanism which comprise the plate 15, slide 14 and heel 13, which action stretches the glass column 69 about as shown in Figure 3.

The glass column 69 is further attenuated, or stretched, because at this instant the contacted glass 73 at the lower face 37 of the heel 13 and that portion of the glass column which occupied the conduits 41, is now no longer held by these parts but has been dislodged with the result that the gravity and flow of the column glass body is now acting to stretch the column of glass 69 in the opening of the mold-bore 47 to a greater extent than theretofore and partly at points below the said mold-bore, due to the resistance of the glass surface 38 and its body 39 at the base of the column 69.

In this method of operation on the glass, the glass gathering mechanism is elevated about at the instant when the relations are as shown in Figure 10, so that it is again in tight contact with the bottom of the mold and following the establishment of this contact the slide 14 is then moved forward or outward in the direction of the arrow 49, (see Figure 6) regarding the position of the slide to the plate, thus causing the edge 43 of the conduits 40 and 41 to be shifted transversely and to eclipse the circular orificial edge 44 of the conduit bore 46 in the plate 15, cutting across the column of glass at its attenuated portion 70 (see Figure 3), which will leave the necked in glass blank extension 71, as shown in Figure 13, below the mold-bore 47. This downwardly tapered extension 71 will be suspended in space without any direct contact with the surfaces of the molding cavity 72, which has been formed by the alignment of the cavity 68 with the bore 46.

The cut thus taken through the diameter of the column of glass, or supplying glass, normally would leave the same kind of a shear-mark as in the ordinary severance of a suspended gob of glass, so called, from its source in a discharge orifice but for the now to be described procedure.

This procedure consists in causing a compressive force to operate in the top end of the glass blank in the bore 47, thereby extruding a flow of previously untouched glass of high temperature from the internal central portion of the blank. The suspended stub-end 71 of the blank will now act as a spout to discharge this glass from the central portion of the blank as the compressive force is applied by plunger or air at the upper end of the blank, thereby causing a flow of fluxing glass which will spread around and submerge the stub 71 while at the same time the exterior surface of the stub 71 will be partly remelted, the final result being that a new bottom end 76 is formed on the lower end of the blank, the exterior surface of which now receives its first chilling contact in its superficial skin layer along a smooth spherical surface in the cavity 72, as shown in Figure 13, and which will therefore have no shear-marks, or marring of any kind when this glass blank is blown into a bottle, or when such blank is otherwise shaped, due partly to this also, that the glass which contacted with the shearing edge 43 of the slide 41 had only a very short duration of right-angled chilling contact locally at the lower face of the edge of the stub 71 and further, because this edge then produced, where the horizontal and vertical exterior surfaces of the blank stub 71 were joined, are now immediately covered over with a glass of fusing temperature and thus merged into said glass at points a distance within the lower and now rounded end of the blank which was brought into being during the compression of the blank as partly shown in Figure 13.

Another method of severing the glass column 69 is shown in Figure 6, where a column of glass is represented as being divided or cut into separated portions by cleavage along a horizontal plane without any prior attenuation of the glass column in the region of its plane of severance. The advantages of this form of operation will be hereinafter pointed out more fully in connection with the description concerning all of the steps of methods practised, as shown in the Figures forthwith.

It has been pointed out that the heel 13 of the gathering mechanism has a bottom face 37 which is disposed, or originally arranged at a suitable angle relative the horizontal surface 38 of the glass body 39, so that this surface 37 may obtain a grip on the glass surface 38. This heel portion 13 and its surface 37 are arranged to exert a certain amount of pressure against the surface of the glass 38 or body 39 when moved therethrough, as indicated by the various figures, such as 5, 6, and 13, the proposition being that when the heel 13 is speedily moved across the glass surface 38 it will cause glass from said surface to be impelled upwardly into the conduits 41 of the heel 13.

In order to make certain that a positive grip be obtained upon the glass surface at all times by the lower base 37 of the heel 13 when the same is in glass contact and to prevent any slippage of the surface glass 38 and to make possible a greatly increased speed during the gathering of molten glass into molds by suction, and also to make unnecessary or less desirable from an economical point of view, such adjuncts as the rotary gathering tank and its more or less contaminated glass body, the surface 37 of the heel 13 is provided with a series of small cupped pockets 75 which are in communication with the inner chamber 77 of the heel 13 by means of the hairline bores 78.

The chamber space 77, in the body of the heel 13, completely surrounds the walls of the two conduits 41 through which conduits the glass is elevated into the mold-bores 47. This chamber has passage 79 communicating with a bore 80 of the blank-mold, as shown in Figure 10. This bore is connected with any suitable device for exhausting air or any suitable vacuum-tank so that a suctional action will extend through this bore and passage into the chamber 77, or a partial vacuum be effected therein.

As soon as the vacuum is established in the chamber 77, or a partial vacuum is effected therein, the air will immediately exhaust from the cupped pockets 75, by which activity these pockets are converted into a series of active suction cups, each of which will hold on to a small portion of the glass surface 38 surrounding the openings 42, resulting in that the contacted portion 73 of the glass surface 38 will be positively attached to the heel surface 37 and can be moved by said surface away from the point of its first contact therewith, in the direction of the movement of the mold to which the glass gathering mechanism is related, so that all successive molds and their glass gathering mechanisms will always be serviced with a virgin glass of uniform consistent fluidity. The removal of the contacted portion 73 being accomplished by each successive heel surface 37.

The natural cohesiveness of molten glass at the temperatures prevailing at the gathering point in a glass furnace and the normal inertia of the glass is generally such, that without the suction feature in the surface 37 the transit speed of the blank-molds through the zone of glass gathering would be much reduced.

This feature of obtaining a grip on the glass surface or the glass which is chilled by contact with mold elements by the utilization of suction in the surface of the contacting element, is not confined for its use to the glass gathering function of the mechanism shown, but may be utilized in the lower end of a suction mold, if incorporated as an integral part thereof, or if such mold is constructed to include this feature of the invention as a supplemental part for the purpose of moving the contacted surface of glass away from the point of contact of a succeeding mold. Such an arrangement as an integral part of the mold would normally be troublesome on the account of the tendency of the mold to become superheated at its lower end, but if cooling feature were added or adequate means for cooling were employed, such use of the invention could be had although not a part of a gathering mechanism as herein shown.

Prior to contact with the glass surface 38, the face 37 of the part 13 should be cooled so that the glass may not have any tendency to stick thereto and it will be advantageous as a positive dislodging action with reference to the contacted glass to direct a blast of compressed air through the bore 80 and the passage 79 an instant before the slide 14 is actuated to cut the glass column 69 whether or not at such time the mold and the glass gathering mechanism have been elevated with reference to the glass surface 38 or depressed thereinto, or whether or not the relationship is as shown in Figures 3 or 10, various forms of such technique are a part of this invention as a matter of variations in method practices or as promoted by common sense in the usage of the apparatus for the obtainment of desired results.

A partial increase in air pressure may also be had in the chamber 77 by communicating compressed air from the bore 80 through the vertical bore 81 (see Fig. 10), after the slide 14 has been moved to cut and disconnect the lower end of the glass column from the blank portion 45 thereof; and a superatmospheric pressure can be had by increasing the length of the plate 15 at its outer end 141 so as to cover the lower end of the bore 79 in the heel portion 13, when the bore 81 is aligned with the upper portion of the bore 79 in the plate 15.

The use of compressed air will, of course, insure a more positive release and ejection of the contacted glass from the pocket 75 and also out of the conduit portions 41. Compressed air may also be caused to impinge on the top end of the glass in the passage 41 after it has been disconnected, cut or removed from the lower end of the blank 45, by providing side vents in the lower face of the plate 15, by which vents the compressed air could be communicated above the cut end of the base of the column or supplying glass beneath the orificial edge or rim 43 of the passages or conduits 41; normally, however, this glass will fall downward out of the orificial portions or passages 41, when disconnected from the glass blanks 45.

As shown in several of the drawings, it is indicated that beside the described functions and movements of the gathering mechanism, the same may as a whole be elevated or raised into contact with the mold bottom 29 and lowered out of such contact and thereafter moved away from the vicinity of the mold.

It should be understood that these movements are partly for the purposes of carrying out process steps with relation to the glass, but that they are also partly for purposes of disconnecting the gathering mechanism from the blank-mold and for moving the mechanism to make clearance for the associated blow-molds, which in most machines of the suction gathering type have to occupy the same position or space around the glass blank 45 as was previously occupied by the blank-mold.

In normal practices with a rotary machine in which glass blanks are gathered by suction, it is customary to suspend the blank of glass bodily from the neck-mold after the blank-mold has been opened and withdrawn, at which time the blow-mold is brought in position to close around the blank of glass. During this phase it is necessary to locate the glass gathering mechanism so it will be out of the way of the blow-mold, which mold generally approaches the suspended glass-blank from points below the same. To accomplish this removal of the glass gathering mechanism, certain necessary mechanical features have been added and attached to the dipping head structure of the bottle machine.

In this connection, it should be noted that the shaft 34 herein used in connection with the glass gathering mechanism, is the same shaft as the cut-off supporting shaft of the Owens machine (see Fig. 16), which shaft is given rotation in opposite directions and is raised or lowered at predetermined intervals by operative mechanisms in the dipping head.

The mechanism to carry out the movements of the gathering mechanism as a whole, with relation to the blank mold (see Figs. 10, 11, 12, 14 and 15), comprises the stationary bracket housing 86, which is bolted to the side of the dipping head structure at the lugs 87, of which several are provided, so that this bracket may, in fact, be considered as an integral part of the dipping head structure.

Figures 16 and 17 represent a side view of the Owens machine with the auxiliary machine attached thereto.

The shaft 34 is raised or lowered by means of a cranklever arm 160, which is actuated by means of cam groove 161, roller 162, slide 163 and arm 164, which rock the crank back and forth as required for the different positions of the gathering mechanism.

The shaft 34 is likewise rotated by the cam 165, roller 166, slide 170 and the gear rack 167, and pinion 168, which last is mounted on the top of shaft 34, the rack being advanced horizontally to rotate the pinion and the shaft 34 in opposite direction, as required for the glass severing action or for removing the heel combination 13, 14 and 15 from the vicinity of the blank mold.

The link 90 is carried by the arm 169 which swiveled on shaft 34 by collar 169' so that the same up and down movement is given to shaft 88 as is normally given to shaft 34.

The shaft 88 is mounted for vertical movement in the bore 91, of the bracket hub 92, and the upper end 89 of the shaft 88 is secured to the link connection 90 which is actuated by any suitable means in the dipping head structure to raise or lower the shaft.

The lower end of the shaft 88 has secured thereto the hub 93 which is formed into a forwardly projecting hub 94 that is adapted to engage the recess 95 of the adjustment nut 96, which has a threaded connection with the shaft 97.

The shaft 97 is turnable at its upper and lower ends 98 and 99 in the upper and lower bearings, or bores 100 and 101 of the member 2, so that when the top end 98 of the screw shaft 97 is turned manually, the nut 96 which is otherwise confined in a slideway 102 of the supporting member 2, will be moved upward or downward on the shaft 97, according to the direction which the shaft 97 is turned, by which several arrangements the supporting member 2 and its foot extension 3 may be vertically raised or lowered in the housing member 1, by the expedient of turning the shaft 97. The adjustment nut of threaded member 96 is vertically adjusted by any turning movement given to the shaft 97 so that the member 2 is either raised or lowered relative the lug 97 at the lower end of the shaft 88 and this adjustment is for purposes of attaining proper registration of the gathering mechanism which is carried by the foot 3 of the member 2, with relation to blank-molds of different height or length, in order to obtain accurate adjustment of the bottom surface 29 of any such mold.

The adjustment nut 96, as shown in Figure 10, will however always be in position to be in registration with the lug 97 because of the stop-pin 103, in the housing 1, which limits the downward movement of the nut 96, correspondingly all of the parts of the gathering mechanism carried by the foot 3, can never be moved a greater distance away from the bottom of the mold than is permitted by the stop-pin 103, see Figure 10.

The stop-pin 103 of the housing 1 also functions to limit the downward movement of the member 2 and its foot extension 3 at times when the recess 95 of the nut 96 is out of engagement with the tongue portion 94.

The upper section of the housing 1 is connected to the dipping head bracket 86, by means of the bore 104 and hinge-lugs 105 and 106 and the similar hinge lug 107, which last is a part of the stationary bracket 86. The lower portion of the housing 1 is likewise connected to this bracket by means of the hinge-lugs 109 and 110, the bracket hub 108 and the stub shaft 104 which is moveable in the hub 108 and rigidly secured to the lower lug 110 by the screw 112 (see Figure 12).

The purpose of this hinge arrangement is to enable the housing 1, and all of the parts of the glass gathering mechanism carried by the housing to be moved as a unit on the horizontal plane around the vertical axis of the hinge-pin which, in fact, forms a swivel point around which the housing 1 and its associated parts may be swung, or rotated to remove the plate 15, slide 14 and heel 13 from the vicinity of the blank-mold after the forming of the lower end of the glass-blank and before the blow-mold is brought into cooperation with the glass blank.

The means for imparting a swinging movement or part rotation to the housing 1 are shown in Figures 11, 12, 14 and 15, and consist of a rotatable double cam 113, which is rotated by the shaft 34 and is so related to said shaft by means of the key 114 and the key-slide groove 115, that the shaft 34 is free to be moved vertically up or down through the hub of the cam which hub is held and kept from any vertical movement by the wall portions 116 and 117 of the bracket 86.

The screw 131 serves to lock the cam 113 to the key 114 so that when the shaft 34 is rotated, or moved, to the left or to the right, the cam 113 will be moved in the same direction by the shaft 34.

The cam 113 is constructed of an upper disc 118 and a lower disc 120. The peripheral face of the disc 118, has bearing against the roller 119. The roller 119 is mounted in the upper inner portion, or shelf, of a lever arm 122 and the peripheral face of cam disc 120 bears against the roller 121, mounted in the lower section, or shelf, within the arm extension 124 of the lever arm 122 and both rollers are mounted an equal distance from the center of the shaft 123 around, or on, which shaft the arm 122 and its extension 124 is journaled and around which shaft it is moveable. This shaft 123 functions as a fulcrum, or pivot, for the arm 122 and its extension and the rollers are placed on opposite sides of the shaft, as shown in Figure 14.

The cam disc 118 and 120 of the cam 113 are so shaped and related to the rollers, that when the cam is rotated clockwise, or to the right, by the shaft 34, as viewed in Figure 14 with the parts as shown therein, the arm 122 and extension 124 will remain stationary, but when the shaft 34 and the cam thereon is rotated to the left, or anti-clockwise, the arm 122 will be impelled and moved toward the shaft 34 and cam 113, while at the same time the arm extension 124 will be moved away from the shaft 34 and the cam thereon, at which time, the forward portion 125 at the outer end of the arm 122 will be impelled to move directionally as indicated by the arrow 126 (see Figs. 12 and 14).

The forward portion 125 of the arm 122 is connected to the link 127 by the pin 128 and this link is journaled, or pivotally secured to the lugs 106 and 109 of the housing 1 by the pin 129, so that when the outer end 125 of the arm 122 is moved in the direction indicated by the arrow 126, the link 127 will cause the housing 1 to rotate around the hinge pins 104 and 104' the thrust of the link 127 causing the lugs 105, 106, 109 and 110 to turn around the hinge pins and rotationally swing the entire housing on the horizontal plane around the vertical axis of the hinge pins (see Figs. 12 and 14). When this action occurs, the entire glass gathering mechanism is swung to one side and entirely away from the bottom face 29 of the mold 48; however, this action will not take place until after the supporting member 2 has been lowered so as to release the pin 23 from the recess 18 (see Fig. 8).

As heretofore described, the cam 113 is rotationally actuated by the vertical shaft 34 and this happens at regular pre-determined intervals, but the arm 122 is only caused to move when the peripheral curvatures of the cam discs 118 and 120 so compel, and depending on the direction of rotation of the shaft 34.

The rocking movement of the arm 122 and its extension 124, around the shaft 123, is arranged to come about only when the glass gathering mechanism must be moved away from the mold 48 or when it is brought into alignment with the mold prior to its elevation, or prior to the gathering operation and at such time the locking bar 132 of the housing 1 moves into the recess 133 which is provided in the hub 92 of the bracket 86, so as to afford rigid support to the housing 1, not only at its rear end, but also at its point more adjacent to the mold, so that the member 2 may be rigidly held in a vertical position during its upward or downward movement.

The rear end of the housing 1, see Fig. 10, also carries a screw shaft 134 which in connection with a threaded nut 135, the springs 136 and 137, the chamber 139 and the spring retaining plug 138, form a tension device for maintaining correct horizontal equilibrium of the member 6 and the parts carried at the forward end thereof, with relation to the bottom face 29 of the mold.

The hub 8 at the rear end of the member 6, see Figs. 1 and 2, is attached to the lower flattened end 140 of the screw shaft 134 and the rear end of the locking lever 125 is also secured to the same hub by means of the pin 26, as heretofore indicated. As shown in Fig. 10, the parts of the mechanism which associated with the glass and the mold are, or comprise the plate 15, slide 14 and the heel 13, which are all united into one glass gathering unit, and as shown in this figure, these parts represented as a unit have been elevated by the member 2 when said member was lifted by the parts 90, 88 and 94. As this position is gained by the glass gathering mechanism prior to its association with the body of the glass 39, the upper spring 136 above the nut 135, has been compressed because the shaft 134 has also been raised or elevated in the chamber 139 of the housing 1 by the tie-up of the lower end 140 of the shaft with the hub 8 and the rear end of the lever-arm 25, thereby causing the nut 135 to bear against the lower end of the spring 136 and partly compress same, which action has taken place when the upper face 19 of the plate 15 encounters the surface 29 of the mold. It may be understood that prior to this relationship a certain amount of downward pressure was exerted on the rear end of the member 6, which increased as the member 2 was elevated.

Immediately as the surface 19 of the plate 15 is brought into contact with the face 29 of the mold, a certain amount of resilient pressure is caused to come about by a resilient connection with the link 90 (not shown) so as to give an increased pressure contact of the plate 15 with the bottom of the mold and, at this instant, an equal amount of resilient pressure is brought to bear in a downward direction against the rear end 8 of the part 6, so that the downward pressure will be approximately equal at both ends of the part 6 on the opposite sides of the stub-shafts 5, thereby making it possible to correct any bending tendency in the supporting parts 3 of the member 4, or of the arms 9 of the part 6.

The intention of the arrangement is to have enough of resilient pressure built up and bearing down against the member 6 at its rear end, so as to equalize the amount of resilient pressure brought to bear on and active at the forward end of the part 6 when the parts are in the position shown in Figures 5, 6, 7 or 10, the object being to prevent leak of air into the vacuum system of the glass gathering mechanisms, the mold-bore 47 and the bore 80.

When the downward movement of the member 2 and its horizontal foot portion 3 is to be caused, or is desirable to occur, before or after cutting of the glass column 69, or for any other modification of operations with relation to the glass charge, the link 90 is caused to be actuated to impart the desired downward movement, or variations in downward movement, to the shaft 88 which then imparts the same movement to the parts 2 and 6.

The normally required distance in downward direction of such movement is for the purpose of locating the upper face 19 of the plate 15 in such position with relation to the mold as to be able to clear the button 23 below the mold face 29 and thereby enable a transverse movement of the glass gathering mechanism away from not only the bottom of the mold, but also away from the space in which the blow mold is to operate, as heretofore described in connection with the horizontal movement of the housing 1 and during this downward movement of the member 2 the spring 137, which is located below the nut 135 in the chamber 139 acts to speedily equalize the downward pressure of the springs 136.

In the practise of this method of gathering molten glass, the forward end of the glass gathering mechanism, which comprises the plate 15, the slide 14 and the heel 13, is moved into the position shown in Figure 4. This will occur as the mold 48 moves in over the glass surface 38 of the glass body 39 of the glass furnace. The glass body 39, mainly being located in a suitable furnace extension to accommodate a series of molds equally equipped with associated glass gathering mechanisms.

As each of the molds 48 in their successive transit toward or over the glass body, or pool of glass 39, arrive at the point at which contact should be made between the bottom face 37 of the glass gathering mechanism and the glass surface 38, the mold and the mechanism are brought into close contact with one another and the blank mold supporting structure, or dipping head, is then lowered sufficiently to contact the bottom surface 37 with the surface of glass 38. At this instant the mold and the mechanism are moving in the same direction, as they are carried by the same supporting structure, as indicated by the arrow 40, in Figures 5, 6 and 7.

As the lower end of the heel 13 and the surface 37 thereon impresses itself into the glass surface 38, the suction cups 75 are brought into operation by the establishment of a vacuum in the chamber 77 of the heel 13. The vacuum action immediately brings about a close grip between the cups and the glass surface, so that the same is forceably held to the lower face 37 of the heel and as the mold and gathering mechanism are moved this contacted surface portion 73 is moved in the direction of movement of the mold and of the gathering mechanism. Simultaneously to the suctional activity of the vacuum cup 75, the mold bore 47 and its extension passage 41 is also vacuumized, thereby inducing an upward flow of the molten glass through the central portion of the contacted glass area 73 and the relationship is then about as shown in Figure 5; the slant of the surface 37 aiding materially in forcing the glass upward through the passage 41.

As the mold-bore, and in this instance there are two mold bores of a double blank mold, is or are being filled with glass and a full glass charge obtained in each bore 47 of the mold 48, the slide 14 of the mechanism is driven forward in the direction indicated by the arrow 49, by the means heretofore described for this action, at which instant the mold and the mechanism may be slightly elevated, as shown in Figure 6, and the contacted glass surface 73 has been then released from the bottom face 37, this release occuring an instant before the slide 14 was actuated in the direction of the arrow 49, by the use of super-atmospheric pressure in the chamber 77, communicated thereinto from the bore 80 of the mold.

The mold 48 and the plate 15 of the mechanism, as shown in Figure 6, are locked together and move in an opposite direction to that of the slide 14 and the heel 13 so that at the time of the cutting of the column of glass, as shown in Figure 6, the lower portion of the column in the bore 41 is practically stationary in respect to the glass surface 38 and the released contacted surface portion 73 thereof.

At the instant the lower portion of the column 69 is severed from its upper portion, as shown in Figure 6, it will be advantageous to continue the elevation of the mold and the gathering mechanism, which will result in a speedy release of the lower or base end of the column from the orifical portion 41.

This release of the contacted surface glass 73 and of the glass in the passage or passages 41 should preferably occur at a point of the furnace structure to one side of the gathering pool itself and at a slightly higher level so as to stimulate a gravity flow of the discharged and contacted glass portions toward such a point of the glass furnace where it may become a part of the fresh batch of glass, and for such purposes it is best that this delivery be made within a compartment closed off from the glass body 38.

Fig. 18 illustrates the completed charging of the mold 48 with glass, the neck forming nipple 171, being seated partly in the mold 172 and partly in the upper end of the mold.

The vacuum action required for the operation is supplied from pipe 173 and the spring pressed valve 174 located in the dipping head 175.

The bore 80 being vacuumized from this source at the same time mold bore 47 is vacuumized, this action reaching to the bottom surface 37 of the heel 13 and the small openings 75 thereat.

The compression period on a glass blank customary in the Owens machine operation is illustrated in Fig. 19.

For the purposes of this invention this operation is used not only for compressing the blank, but also for reshaping the lower end thereof, as heretofore described.

The operation consists of withdrawing the nipple 171 from the glass blank 69 and causing compressed air to be advanced into the dipping head 175 and space 177 therein, by moving the air-conducting slide valve 176 into position to close over the space formerly occupied by plunger 178.

It may not always be desirable to have such an arrangement for the discharged and contacted glass portions and in such event these portions may be left to one side of the gathering pool from whence they will eventually move and become a part of the gathering pool body 39 as soon as they have been restored to approximately the same gravity and fluency as the glass of the pool itself. Normally the contacted glass would sink and gravitate towards the lower stratums of the pool from which lower position this glass would gradually work upward and merge with the glass body. The customary heating of the discharged portion being necessary to restore fluency.

In this process, it should be noted that all of the discarded portions from each successive mold are left at practically the same point at one side of the pool itself and not in any way separated therefrom by a wall, so that each discharged portion is practically super-imposed upon the preceding one so they will build up a slightly elevated bump of the glass body 39, which will produce a downward movement of the glass directly at the point where each cut off portion is deposited.

It should be observed that each discarded lower portion of the column contains a considerable portion of very fluent glass and this fluent glass acts to cover each of the succeeding discharged contacted portions so that the pile of discarded portions built up to one side of the gathering pool will, in reality, be composed of layers of contacted partly chilled glass alternating with layers of glass fully as fluent as the glass at the gathering point. In the present instance there will be two such discharges side by side from the two passages or conduits 41 which fluent glass will flow out and cover over the top portion of the prior discharge from the prior glass gathering mechanism, all of which travel in the same direction.

This sandwiching of a layer of contacted glass with a layer of hot glass has practically the same result, in as far as restoring a workable fluency in the pool of glass after a great number of discharged portions have been deposited at the side thereof, as if this contacted glass had been covered with a stream of fresh glass from the refining end of the furnace.

After the lower end 76 of the blank at the lower end of the glass column 69 has been formed by the severing action and a glass blank portion thus has been separated from the supply, the relationship of the gathering mechanism to the mold would be about as shown in Figure 7, the recess-cavity 68 being disposed below the bore 46 and forming with said bore the cavity 72.

As this cavity is formed the lower end 76 of the blank 45 will be suspended within the cavity 72 about as shown in Figure 7 and at this instance compressed air or plunger-compressor is caused to operate at the top end of the blank 45, which will result in a glass discharge through the cut end of the blank to fill the cavity 72. As this is done, the glass gathering mechanism is lowered a distance about as shown in Figure 8, at which time the upper constricted portion of the bore 46 will shape the previously molded end portion 76 of the blank 45 to the shape indicated in Figure 8.

The end of the blank 45 has now been given its final form prior to the blowing of the blank in the blow-mold, which occurs as soon as the mold has been open to expose the rest of the body of the blank, the lower end 76 of the blank having no further contact with any material likely to conduct heat away therefrom.

Compressed air may also be admitted into the recess cavities 68, in the manner shown in Figure 9, by means of the additional bores 150 in the mold, and 151 in the slide 14 and these small passages may also be used for evacuating air from the completed cavity 72, if that condition would be advantageous, under any form of operation.

If compressed air was admitted into the cavity 68 when such cavity is in the position shown in Figure 7 with the glass suspended therein, the compression would tend to round the glass and shape the lower end of the blank without any further contacting of the lower end of the blank with the molding cavity 72, in which event the application of any compressive force at the top of the blank would not be necessary. Again, if the cavity 72 is vacuumized the result would be to draw the glass downward and under normal conditions that action would taper the lower end of the blank without adding much if any glass to its body and that would also be beneficial in avoiding a second contact with the already partly chilled glass, however, in event of the compressive force acting on the top of the glass blank to discharge hot glass from its central portion into the cavity 72, the prior surface chilling from contact with the upper face of the slide 14, will be entirely dissipated, due to the hot glass which is caused to surround the cut end at the time of the remolding thereof in the cavity 72.

In some forms of operation it may be advantageous to dispose of the relatively large cavities 72 and in such event the bore 46 in the plate 15 is shaped, as shown in Figure 16, while the upper end of the passage 41 is formed into a knife edge 152, cooperating with the knife edge 153 of the bore 46, for the cutting operation of the glass column, after which operation the cavity recess 154 is brought into alignment with the bore 46, so as to form a tapering molding cavity for shaping up the lower end of the glass blank and giving it a corresponding rounded form with cavity, as shown in Figure 16, for the lower end of the blank; the so-called shear-mark will be largely eliminated, but not quite as well as in the preceding forms herein discussed. The best forms of operation for eliminating shear-marks being that appearing in the relations of the part as shown in Figure 3 and the method description heretofore given of the same.

With relation to the method of severing the base of the glass column from the blank or mold charge portion thereof shown in Figure 6, it should be noted that this type of severing is very different from the usual method of severing with shears, of the single knife cutting action in the ordinary suction glass gathering machine. This difference consists in, that both of the sections which are to be severed are held in a very tight grip and the shifting of the lower end of the column from its upper portion results in a form of severing which may be classified as cleavage, as there are practically no shear-marks or dragging of previously contact chilled side surface glass of the column, but the cut is to all intents and purposes, free from noticeable bottom side chilling.

In this form of cutting, the greatest resistance to the penetration of the glass column is offered by the glass at the very beginning and as soon as this initial resistance has been overcome, there apparently is no further resistance to the cutting action, which indicates that the entire line of cleavage through the glass body at the upper edge 43 of the conduit or bore 41 is separated from its adjoining horizontal stratum along the edge 44 in the bore 46 at the same time, the rupture or fracture being instantaneous at all points along a horizontal plane, between the two edges and not progressive as in the case of severing a suspended glass charge by shearing action with shearing devices.

Another method of operation when charging the blank mold bores 47 would consist in elevating the mold and the glass gathering mechanism to such a point above the glass level 38 that the final quantity of glass to enter the bores 47 would be taken, not from the glass body but from the passages 41, leaving only a small fraction of glass in such passage to be disconnected from the blank body in the mold and to be discharged from these passages. Under such conditions the glass cutting operation would be different from that illustrated in Figures 3 or 6, but would come closer to the type shown in Figure 3.

All of the method practices herein described are inter-changeable and many variations of the same may be practiced without any departure from the scope of this disclosure, which it is believed is sufficiently inclusive and informative to enable those skilled in the art to practice this invention, not only within the relatively narrow limits of the ways and means disclosed but along lines of different application.

Having thus described my invention, I desire to claim:

1. The method of obtaining glass mold charges, which consists in causing molten glass to advance from a pool or supply thereof through a passage part, into the bore of a blank mold, and forming the charge in said mold by suction, severing the mold charge thus advanced from its source in the pool at a point below the bottom end of the mold, while increasing the diameter of the glass at the said point.

2. The method of eliminating shear-marks from the cut end of a glass blank immediately upon the formation of the blank, which consists in forcing out hot glass from the interior of the blank to cover around the cut end and molding this hot glass around the cut end into a rounded uniformly surface-congealed-blank end.

3. The method of gathering from a pool of molten glass mold charges into the previously cooled lower end of mold elements, the lower face of which is provided with a series of suction cups and of removing contact-chilled glass from the pool, which consists in forming first a stationary semi-solid body in the surface glass of the pool by contacting the cooled end of the element with the surface glass of the pool and by holding this portion to the said lower end by vacuum at the point of first contact of the said glass with the said cups of the element and of removing the thus held and thereby chilled portion of the surface glass directionally along with the mold element while advancing non-chilled glass from the pool through the said portion into the mold element by suction, and when charged lifting the mold element with the charge and the said movable chilled portion from off the surface of the pool.

4. The method of removing contact-chilled glass from the surface of a stationary pool of molten glass during the gathering of mold charges from the pool; which consists in dipping a series of gathering mold-implements into the surfaces of the pool of molten glass, each one of the said implements, one after the other, doing the contacting at the same point of the pool, thereupon chilling and gripping all of the glass contacted by each implement and moving it as a unit body away from the said point of contact, while gathering each mold-charge, and subsequently releasing the chilled portion from each implement successively at a predetermined point of the pool to build up at said point a slowly sinking body of accumulated chilled portions.

5. The method of removing contact-chilled glass from a glass gathering zone of a supply of molten glass during the operation of taking a mold-charge therefrom into the bore of a suction mold in transit thereover; each mold being equipped with a surface glass gripping element, which consists in contacting said element with a horizontal surface portion of the glass supply while causing vacuum action to operate in the glass contacting surface of the said gripping element and securing an air-tight sealing hold upon the contacted glass portion, in vacuumizing the bore of the mold and drawing glass thereinto from the supply through the said first contacted and vacuum held portion while moving the mold, the said gripping element and the said portion first horizontally along the surface of the glass-gathering zone and then vertically relatively to the said surface while cutting the mold-charge from the supplying glass in said element, thereupon discarding the previously vacuum held glass portion from the element at a point outside of the said glass-gathering zone.

6. The method of suction gathering of mold charges from a pool of molten glass, by a suction mold equipped with a glass contacting part having a passage leading to the suction bore or cavity in the said mold; which method consists in moving each mold so equipped into contact with the pool and securing a sealing suction-hold with the said part upon a definite horizontally disposed portion of the glass surface of the pool at a series of points outside of the said passage, thereupon causing suction to operate in the said mold-bore and impelling a flow of glass from the pool through the said passage into the mold while simultaneously moving the mold with the said part and the said sealing portion of the glass a predetermined distance across the pool, so as to take each mold-charge progressively from different submerged points of the pool, thereupon as each mold is charged and the mold-charge is secured breaking the said sealing hold of the said glass contacting part upon the said surface portion of the glass and depositing said portion to one side of the pool.

7. The method of gathering molten glass by suction from a pool of molten glass into successive blank-forming elements and shaping the gathered glass to form glass blanks with a rounded freely suspended end, consisting in advancing each element into contact with the pool and forming a semi-congealed partly impressed horizontal portion in the surface of the pool at the point of first contact of each element therewith, then obtaining a suctional grip and seal of each element with the said portion, and moving the element and the thereto sealed glass from the location of first contact, along the surface of the pool during the blank gathering operation, then as the element is charged attenuating the lower end of the glass-blank to form a stem and cutting through the said stem to separate the glass of the blank from that of the pool, incidentally disconnecting the said congealed portion from the element and depositing it outside of the pool, and simultaneously therewith forcing glass from the body of the glass-blank in the element to surround the exterior of the said cut stem of the blank and thereupon rounding, tapering, and freely suspending the lower end of the blank.

8. The method of taking mold-charges in successive sequence into suction molds from a supply pool of molten glass without spilling contact-chilled glass back into the pool, consisting in forming a unitary molded portion in the surface of the pool at the point of contact of each successive mold therewith, in advancing glass from the pool through the said portion into each suction mold, in moving each said portion, in the surface of the pool along the path of transit movement of each mold while charging the mold, in lifting each said portion above the surface of the pool while simultaneously elevating the mold relative to such portion and then severing the mold-charge while discharging the said portion outside of the said pool.

9. The method of suction gathering successive charges of glass into blank-forming mold elements from a pool of molten glass and removing contacted glass from the pool, which consists in forming a movable portion of semi-solid body in the surface of the pool of molten glass at the point of first contact of each such element with the surface glass of the pool, then moving the said portion along with the mold element while employing suction to advance glass from the pool through the said portion into the mold element, in lifting the said element and the said portion away from the pool while severing the mold-charge at a point above said portion and then depositing the said portion at a point separated from the pool or from that portion thereof from which successive mold-charges are to be gathered.

10. The method of removing charges of glass in molds from a pool of molten glass without chilling that glass of the pool from which subsequent charges are to be removed, consisting in forming a unit surface body of congealed glass in the surface of the pool between each mold and the molten body of the glass of the pool, in keeping each said congealed body interposed between the mold and the molten glass of the pool during the removal of each said mold-charge and in moving each contact-congealed body as a unit away from the surface of the pool at the time of removal of each mold charge from the pool.

11. The method of removing, from a pool of molten glass, chilled glass which has become congealed from contact with previously cooled mold-elements, consisting in sealing the lower face of each mold element to the top layer of the pool, in advancing glass from the pool through the said sealing layer into the mold element to produce the glass charge while keeping the said layer as a chill absorbing shield interposed between the said element and the pool, in severing the charge from the advancing glass and then removing the said sealing layer shield from the lower end of the mold element and from the vicinity of the glass of the pool.

12. The method of taking mold-charges into suction mold-elements from a pool of molten glass in a glass furnace without leaving contacted glass in the pool, which consists in obtaining a definite hold upon all of that portion of the top layer of the pool which contacts with the lower end of the element to confine chilling to the said contacted portion and constantly interposing this portion between the element and the adjacent glass of the pool to protect said glass from chilling, in advancing an upwardly flowing stream of the glass of the pool through the said portion into the mold element to form the mold-charge while shifting the said portion and the said advancing mold-charge supplying stream along the top layer of the pool in the direction of movement of the element, in discontinuing the said stream advance of the glass and cutting the mold-charge therefrom while simultaneously releasing the said contacted portion from the element and depositing same and the remaining glass of the said stream, which was cut from the said mold-charge, at a predetermined point of the furnace.

13. The method of taking charges of molten glass from a stationary supply pool of the glass into suction-bores of previously cooled molds without allowing contact chilled glass to remain in the pool, consisting in obtaining a suction grip on all of the glass which comes into contact with each mold at points outside of the suction-bore at the time of first association of the mold with the surface of the said pool, in keeping said contacted glass sealed to the mold and interposed between the mold and the pool to localize all chilling in the said contacted portion, in moving all of the said contacted glass with the mold in the direction of mold advance during the charging of each mold, in cutting the glass charge from the glass entering the mold from the pool, at a point above the said contacted glass and discharging said contacted glass and the remnant of the charge supplying glass at a point separated from the said glass of the pool.

14. The method of removing chilled surface glass from a supply body of fluid glass during the contact-removal by suction molding means of mold-charges from said body, which consists in forming a semi-congealed skin in and over a small area of surface glass in the top layer of the fluid glass supply between the contacting end of said means and the main body of fluid glass and forming grippable semi-congealed glass protuberances as a part of the said skin area, engaging said protuberances to hold the semi-congealed area interposed between the said means and the supplying body of glass and confining all subsequent heat loss to the glass of the said skin area, moving the semi-congealed skin area in the direction of the movement of said means during the removal of the mold-charges from the supply body, and subsequently moving the said skin away from the mold-charge supplying zone of the said body of fluid glass.

15. The method of gathering glass into the bore of a mold to produce a glass blank form for blowing and of obliterating shear-marks caused by shearing the blank from its source, comprising, advancing a mass of glass by suction from a pool of molten glass into the bore of a mold and progressively contact-chilling the exterior of said mass of glass during the said advance and thereby producing a semi-congealed surface skin thereon, then shearing off the superfluous glass from that which forms the molded portion a short distance below the mold-bore and returning the superfluous glass to said pool while suspending the lower sheared end of the blank below the said mold-bore, then ejecting through the said suspended end of the blank a quantity of glass from the body of the said blank and enveloping the sheared edge of the suspended end while simultaneously rounding the same and forming a smooth bottom end for the blank, and during the aforesaid actions concurrently for an instant contact-chilling the exterior of the ejected glass to form a semi-congealed skin thereon around the said suspended end of the glass-blank.

16. The method of injecting a glass mold-charge into the blank-forming bore of a mold from molten glass in a supply pool of a furnace and removing from the pool glass contact-chilled during the injection period; which comprises, forming a semi-congealed glass-portion on the surface of the said pool and placing the said glass-portion between the exterior bottom of the mold and the body of the supply pool, then attaching the said bottom of the mold to the said semi-congealed glass-portion to confine contact-chilling by the said bottom to the said semi-congealed portion while injecting a charge of the glass of the pool under pressure into the bore of said mold, then severing the thus obtained mold-charge from the glass of the supply pool while transporting the mold and the said semi-congealed surface portion upwardly and outwardly from the pool, and lastly returning the said by the mold contact-chilled glass-portion to the furnace for remelting.

17. The method of advancing a mold-charge into a forming mold from a horizontally disposed supply of molten glass without leaving contacted glass in the supply, which comprises, surface chilling and contact molding a portion of the top layer of the supply and forming a semi-congealed unit with molded, grippable protuberances thereon, interposing the said unit between the bottom of the said mold and the body of the molten supply and gripping the said protuberances of the unit to retain the unit in said position while the mold is being moved relative to the supply and thereby localizing the heat removing influences of the said mold in and confining them to the said unit while advancing a charge of non-chilled glass into the said mold, lastly severing the glass in the mold from the supply glass and the said interposed unit and depositing said unit and that glass which had been severed from the mold-charge, adjacent to, but separated from the mold supplying section of the said supply.

18. The method of taking glass mold-charges into the bore of a blank mold from a pool of molten glass by suction without leaving contact-chilled glass in the pool; consisting in forming a surface layer of semi-congealed glass on the molten glass surface of the pool, around the inlet opening to the bore of the blank mold, and localizing all chilling by the bottom and body of said mold within the area limits of the said semi-congealed layer; advancing glass from the pool into the bore of the blank mold while moving the said chilled layer from its position where formed together with the said mold during the said advancement of the said glass, and after the mold has been charged, finally dropping the said semi-congealed layer from the mold at a point remote from the blank-mold supplying section of the said pool.

19. The method of gathering glass mold-charges into the bore of a blank-mold from a pool of molten glass by suction without leaving contact-chilled glass at the gathering point in the pool; consisting in forming a surface layer of semi-congealed glass on the molten glass surface of the pool around the inlet opening to the bore of the blank-mold and localizing all chilling by the said mold within the area limits of the said semi-congealed layer, advancing glass from the pool into the bore of the blank-mold, while moving the said chilled layer together with the said mold from its original position during the said advancement of the glass, and after the mold has been charged, dropping the said semi-congealed layer from the mold while thrusting it downward into the pool at a point removed from the said gathering point of the pool.

20. In the art of gathering mold-charges from a pool of molten glass with constantly traveling and successively dipping suction molds, the method of removing contact-chilled glass from the top layer of the pool during the period of travel over the pool and dipping thereinto of each mold; consisting in contact-shaping a definite area-portion of the said top layer of the pool around the glass taking inlet to a suction mold, so as to materially multiply the surface for chilling exposure of the glass and resultant congealing in the said definite area-portion and semi-congealing the said multiplied surface thereof at the instant of shaping, then drawing a charge of each mold and gripping the said chilled surface area to retain it in its position, while removing the mold and the said contact-chilled glass, or surface-area, through the top layer of the molten glass of the pool, and as the mold-charge is obtained, releasing the said contact-chilled top layer area of the glass at a point of deposit away from the path of mold-charging relations of succeeding molds in the said pool.

21. The method of removing mold-charges in consecutive order from the gathering zone of a pool of molten glass, without adversely affecting the fluency of the glass in the said zone; consisting in bringing a previously cooled glass transfer device, for passing glass from the pool to the mold, into intimate pressure contact with a glass receiving end of the mold and likewise, into pressure contact with a definite area-portion of the surface glass of the pool, then chilling the thus contacted surface glass with the said device, to give a semi-solid structure to the said contacted area, and interposing said area of glass between the said device and the pool while passing glass from the pool into the mold through the said device, then shifting the said area of chilled surface glass from its position relative to the mold, while severing the mold-charge and, as the mold-charge is being removed, depositing the said chilled area of the molten glass at a point remote from the mold-charge supplying section of the pool.

22. In connection with gathering glass-blanks for blowing, from a pool of molten glass, wherein a flow of the glass is caused to ascend into the bore of a blank-forming mold by vacuum action; the process which consists in simultaneously surface chilling, molding and tractively engaging a definite area portion of the glass surface of the pool surrounding the point of ascendency of the said vacuum induced flow, in keeping the said surface area portion of the glass constantly interposed as a heat insulating barrier between the glass receiving end of the mold and the body of the glass of the pool during the said induced flow into the mold-bore, and forming a blank for blowing in the said mold by detaching and discarding the said surface area portion and the base of said flow.

23. In the forming of a glass blank for blowing by advancing molten glass in column formation into the bore of a blank-mold from a supply by suction, the process, which consists in forming a base portion for a mold-filling column of the glass in the top layer of the supply and supporting and surface-chilling the said base portion, extending a column flow of molten glass upwardly from the said supply and base portion and externally supporting and surface-chilling the said column, then producing a glass blank for blowing by cutting off the mold filling end of the column from its lower portion and surrounding the cut end of the blank with fluid glass displaced from the interior of the said blank, then rounding and surface-chilling the said fluid glass which was caused to surround the cut end of the glass blank, while delivering the cut-off lower part of the column together with the said base portion towards a predetermined point of the supply, thereby forming by repetition of such delivery, a slowly downwardly moving glass-body current in the molten supply.

24. In the art of gathering glass mold-charges by suction-induced flow from a liquid supply pool of a column of the glass into a blank-shaping mold element, the process consisting in molding and chilling to a predetermined semi-plastic condition in depth a predetermined area of the surface glass of the pool around the path of advance of the said flow and interposing this semi-plastic area between the element and the liquid glass of the pool, engaging the semi-plastic surface area and moving it in the direction of the movement of the mold element during the gathering period, then arresting the said flow advance of the glass from the pool while reducing its diameter and simultaneously cutting through said glass at its reduced point to form a detached mold-charge, then delivering the cut-off portion of the column and the said interposed semi-congealed glass to a side location of the pool while covering over the cut end of the mold-charge with a previously non-chilled glass, ejected from the glass in the mold element and thereupon rounding and tapering the said covering glass and while tapering, freely exposing the same.

25. In connection with suctional gathering of glass mold-charges wherein a column of molten glass is caused to advance from the surface of the molten supply into the bore of the mold element, the process, which consists in forming a partly congealed skin surface body of approximate definite outline and depth in the top layer of the molten glass supply around the base of the said advancing column and anchoring the said surface body around the entrance to the bore in the element during the period of said suctional gathering, then cutting through and displacing the said base of the column to produce a detached mold-charge in the said bore and concurrently returning the said base and the said congealed surface body to a predetermined point of the supply for reassimilation with the molten glass of the said supply.

26. In suction gathering of molten glass from a pool thereof, when a column of the glass of the pool is caused to ascend into the cavity of a mold, the process, which consists in forming a base portion for the column of glass in the top layer of the pool and of moveably supporting said base portion while extending upwardly therefrom a column flow of glass, supporting said column flow partly in the said cavity of the said mold and partly below said mold and forming a mold-charge from the upper mold supported end of the column by cutting across the column at a point below said mold between the same and the said base, and then discarding the cut-off lower end of the column together with the said base portion while removing the mold-charge in the said mold.

27. In the charging of suction molds from a supply of molten glass and forming glass blanks having a uniform surface skin for blowing, the process, which consists in forming a semi-congealed glass portion in the top layer of the supply, extending an externally supported flow of the glass of the supply through the said glass surface portion into the blank-forming bore of a suction mold and forming a semi-congealed surface skin thereon during such procedure, then cutting the said flow from the said blank forming glass in the mold-bore at a point spaced from the said mold and discarding the remnant of the said flow and the said semi-congealed top layer portion while extruding untouched glass from the body of the blank through the said cut end below the mold, surrounding the cut end of the blank with the said extruded glass and forming a symmetrical rounded lower end on the blank of the said glass while surface-chilling the same to impart a semi-congealed surface skin to the said lower end of the blank.

28. In the gathering of molten glass into a mold-element by suction from a supply thereof, the method of insuring a speedy and accurate charging of the mold-element, which consists in exerting a semi-solidifying influence on that portion of the surface glass of the supply with which the mold comes in contact during gathering and sealing the said portion to the mold element at points laterally outside of the path of flow-advance from the supply into the mold element, and when a sufficient quantity of the said advance of the glass has been gathered into the said element, cutting off the said flow and releasing the said sealing surface portion of the glass from the element.

29. The method of taking away contact-chilled glass from a supplying body of glass during the charging of consecutive molds from said body, which consists in removing from the path of operations of the said molds in the said body of glass each mold-contacted and thereby chilled portion of the said body of glass, as each mold is being charged, and as the mold charge is obtained.

30. The method of removing contact-chilled glass from the surface of supplying body of glass during contact-removal of mold charges from said body by suction, which consists in removing each contact-chilled portion of the surface layer of the body of glass from the zone of operation of successive suction molds as each mold-charge is obtained, and in then delivering each said contact-chilled portion at a higher level than the surface of the supplying body, at a point adjacent to the said body.

31. In the gathering of molten glass by suction from a supply into dipping suction molds, the method which consists of producing a less than atmospheric pressure laterally around the entrance to the bore of each suction mold in that confining space which is formed between the bottom end of the mold and the top surface of the glass supply, as the mold in act of dipping is brought closely adjacent to the said top surface and thereby impelling glass from the supply into the said space to meet the said mold and contact with the bottom end thereof, holding and confining the said contacted glass adjacent the bottom end of each mold while concurrently advancing glass from the sub-surface stratum of the supply into the said mold-bore, then severing the mold charge forming glass from the supplying glass while replacing the said less than atmospheric pressure at the bottom of the mold with an atmosphere of positive pressure and expelling the said contacted and confined glass from its position adjacent to the bottom of the mold.

ENOCH T. FERNGREN.